(12) United States Patent
Fujita et al.

(10) Patent No.: US 10,677,214 B2
(45) Date of Patent: Jun. 9, 2020

(54) HYDROELECTRIC POWER GENERATION APPARATUS AND POWER GENERATION SYSTEM

(71) Applicant: NTN CORPORATION, Osaka (JP)

(72) Inventors: Yasuyuki Fujita, Iwata (JP); Tomoya Kawai, Iwata (JP)

(73) Assignee: NTN CORPORATION, Osaka (JP)

( * ) Notice: Subject to any disclaimer, the term of this patent is extended or adjusted under 35 U.S.C. 154(b) by 83 days.

(21) Appl. No.: 15/771,997

(22) PCT Filed: Oct. 3, 2016

(86) PCT No.: PCT/JP2016/079261
§ 371 (c)(1),
(2) Date: Apr. 27, 2018

(87) PCT Pub. No.: WO2017/077799
PCT Pub. Date: May 11, 2017

(65) Prior Publication Data
US 2018/0223792 A1    Aug. 9, 2018

(30) Foreign Application Priority Data

Nov. 2, 2015  (JP) ................................. 2015-215789
Jul. 8, 2016  (JP) ................................. 2016-136055

(51) Int. Cl.
*F03B 15/16*  (2006.01)
*F03B 17/06*  (2006.01)
(Continued)

(52) U.S. Cl.
CPC ............ *F03B 15/16* (2013.01); *F03B 11/008* (2013.01); *F03B 11/08* (2013.01); *F03B 13/264* (2013.01);
(Continued)

(58) Field of Classification Search
CPC ...... F03B 15/16; F03B 11/008; F03B 17/062; F03B 13/264; F03B 13/22; F03B 11/08;
(Continued)

(56) References Cited

U.S. PATENT DOCUMENTS 4,149,092 A * 4/1979 Cros ....................... F03B 13/08
                                                                290/54
4,475,865 A * 10/1984 Sugishita ................ F03B 15/04
                                                                415/36
(Continued)

FOREIGN PATENT DOCUMENTS

CN   202971032 U   6/2013
CN   103511171 A   1/2014
(Continued)

OTHER PUBLICATIONS

International Search Report dated Dec. 20, 2016 issued in International Patent Application No. PCT/JP2016/079261 (with English translation).
(Continued)

*Primary Examiner* — J. Todd Newton
(74) *Attorney, Agent, or Firm* — McDermott Will & Emery LLP

(57) ABSTRACT

A hydroelectric power generation apparatus includes a braking force generation unit configured to apply a braking force to rotation of a hydraulic turbine, and a controller configured to control the braking force generation unit to repeat increasing and decreasing the braking force to vary a rotational speed of the hydraulic turbine. Varying the rotational speed of the hydraulic turbine helps to flow away debris and the like adhering to hydraulic turbine blades. Preferably, the braking force generation unit includes an electrical, mechanical or fluid type braking device configured to apply a braking force to a rotary shaft of the hydraulic turbine. Preferably, the braking force generation unit includes a
(Continued)

power generator configured to generate power through rotation of the hydraulic turbine, and the controller increases/decreases the braking force by varying power extracted from the power generator.

20 Claims, 9 Drawing Sheets

(51) Int. Cl.
    *F03B 11/00*     (2006.01)
    *F03B 13/26*     (2006.01)
    *F03B 15/18*     (2006.01)
    *F03B 11/08*     (2006.01)
    *F03B 13/22*     (2006.01)

(52) U.S. Cl.
    CPC ............ *F03B 15/18* (2013.01); *F03B 17/061* (2013.01); *F03B 17/062* (2013.01); *F03B 13/22* (2013.01); *F05B 2270/20* (2013.01); *F05B 2270/327* (2013.01); *Y02E 10/28* (2013.01)

(58) Field of Classification Search
    CPC .......... F03B 15/18; F03B 13/10; F03B 15/00; F05B 2270/20; F05B 2260/903; Y02E 10/28; Y02E 10/226; Y02E 10/22; H02P 3/00; H02P 3/02; H02P 9/00; H02P 9/02; H02P 2101/22
    USPC .............................................. 416/32; 290/43
    See application file for complete search history.

(56) References Cited

U.S. PATENT DOCUMENTS

| | | | | |
|---|---|---|---|---|
| 8,196,396 B1* | 6/2012 | Tseng | ...................... | F03B 13/08 290/54 |
| 8,742,604 B2* | 6/2014 | Dyer | ...................... | F01K 13/02 290/1 A |
| 2012/0056424 A1* | 3/2012 | Holstein | .................. | F03B 13/10 290/43 |
| 2014/0117667 A1 | 5/2014 | Holstein et al. | | |
| 2014/0236367 A1* | 8/2014 | Ruiz Gomis | ........... | F03B 15/16 700/287 |
| 2014/0246854 A1* | 9/2014 | Spooner | .................. | A47G 19/02 290/43 |
| 2014/0333071 A1* | 11/2014 | Wang | ..................... | F03B 17/065 290/54 |
| 2017/0317627 A1* | 11/2017 | Bergman | ................. | F03B 15/08 |
| 2018/0266383 A1* | 9/2018 | Barg | ......................... | F03B 3/06 |
| 2018/0291871 A1* | 10/2018 | Wibben | ................. | F03D 7/0224 |
| 2018/0313324 A1* | 11/2018 | Yeo | ......................... | F03B 15/12 |
| 2019/0162162 A1* | 5/2019 | Fujita | ...................... | F03B 15/06 |
| 2019/0372495 A1* | 12/2019 | Renaud | .................... | F03B 3/103 |

FOREIGN PATENT DOCUMENTS

| | | |
|---|---|---|
| JP | S49-038117 A | 4/1974 |
| JP | S61-39112 | 2/1986 |
| JP | 2752215 B2 | 5/1998 |
| JP | 2008-261327 A | 10/2008 |
| JP | 2012-197703 A | 10/2012 |
| JP | 2012197703 A * | 10/2012 |
| JP | 2013-189837 A | 9/2013 |
| JP | 2014-202093 A | 10/2014 |
| JP | 2015-151914 A | 8/2015 |
| WO | WO-2018198771 A1 * | 11/2018 ............... E02B 9/08 |

OTHER PUBLICATIONS

The Extended European Search Report dated Feb. 22, 2019 for the related European Patent Application No. 16861867.6.

Chinese Office Action issued in corresponding Chinese Application No. 201680064133.2, dated Aug. 19, 2019, with English translation.

* cited by examiner

HYDROELECTRIC POWER GENERATION APPARATUS AND POWER GENERATION SYSTEM

RELATED APPLICATIONS

This application is the U.S. National Phase under 35 U.S.C. § 371 of International Application No. PCT/JP2016/079261, filed on Oct. 3, 2016 which in turn claims the benefit of Japanese Patent Application Nos. 2015-215789, filed on Nov. 2, 2015 and 2016-136055, filed on Jul. 8, 2016, the disclosures of which applications are incorporated by reference herein.

TECHNICAL FIELD

The present invention relates to a hydroelectric power generation apparatus and a power generation system, and more particularly to controlling a small hydroelectric power generation apparatus.

BACKGROUND ART

Hydroelectric power generation apparatus is a system that uses kinetic energy of running water for power generation. The hydroelectric power generation apparatus mainly includes a hydraulic turbine rotated by receiving a flow of water, a power generator coupled to the hydraulic turbine to convert rotational energy into electrical energy, and a control device which controls an output of the power generator and the hydraulic turbine. Optimum power extracted from the power generator varies with flow velocity, and accordingly, the control device measures flow velocity, the hydraulic turbine's rotational speed, or the power generator's power generating voltage, determines optimum power to be extracted from the power generator, and controls the power generator so that an amount of power generated by the power generator matches the optimum value.

Garbage, aquatic plants, branches, cords and other similar debris drifting from upstream and arriving at the power generator get entangled in the hydraulic turbine and cause a reduction in an amount of power generated. For this reason, countermeasures against such debris are important for hydroelectric power generation. For example, it is preferable to install a device upstream of the hydraulic turbine for removing debris.

Japanese Patent Application Laying-Open No. 2013-189837 (Patent Document 1) and Japanese Patent Application Laying-Open No. 2014-202093 (Patent Document 2) disclose techniques for countermeasures against debris obstructing hydroelectric power generation.

CITATION LIST

Patent Document

[Patent document 1] Japanese Patent Laying-Open No. 2013-189837
[Patent document 2] Japanese Patent Laying-Open No. 2014-202093

SUMMARY OF INVENTION

Technical Problem

Japanese Patent Laying-Open No. 2013-189837 (Patent Document 1) discloses an example of installing debris removal equipment in a waterway upstream of the location of a hydraulic turbine for removing foreign matters. For a small hydroelectric power generation apparatus that can be easily installed in a waterway, however, it is difficult to use such large-scale debris removal equipment because it serves as a factor for increasing a cost. For this reason, it is conceivable to install a simple debris remover such as a comb-shaped filter, for example, in a small hydroelectric power generation apparatus.

Some debris and aquatic plants may flow into the hydraulic turbine of the small hydroelectric power generation apparatus with the simple debris remover. Some debris having flowed to the hydraulic turbine passes through the hydraulic turbine, while other debris is caught by hydraulic turbine blades (or vanes) of the hydraulic turbine. The debris caught by the hydraulic turbine blades are pressed against the hydraulic turbine blades by water pressure and centrifugal force caused as the hydraulic turbine blades turn, water pressure caused by a water current, and the like, and the debris is thus stuck to the hydraulic turbine blades. A large amount of debris and aquatic plants adhering to the hydraulic turbine causes a drop in an ability to generate power. The simple debris remover thus does not serve as perfect countermeasures against debris, and a periodical operation to remove debris adhering to the hydraulic turbine is required.

On the other hand, Japanese Patent Application Laying-open No. 2014-202093 (Patent Document 2) proposes a method of causing a power generator to function as an electric motor, and using a hydraulic turbine blade as a crushing blade for crushing foreign matters to crush and remove debris. Such an approach allows debris to be removed without a significantly increased cost. However, the small hydroelectric power generation apparatus disclosed in Japanese Patent Application Laying-open No. 2014-202093 (Patent Document 2) has the following two problems:

Firstly, in order to drive the power generator as an electric motor it is necessary to provide a control device with a function of an inverter. It is difficult to easily add such a function since a control device for a general power generator only has a function of a rectifier circuit and a DC/DC converter. Secondly, using an inverter to cause the power generator to function as an electric motor is not a purpose as originally intended, i.e., power generation, but power consumption. To cause the power generator to function as an electric motor consuming power is an operation opposite the purpose as originally intended, i.e., power generation, and is an unwanted operation. Furthermore, it is also necessary to ensure a power source for causing the power generator to function as an electric motor.

The present invention has been made to solve the above problems, and an object of the present invention is to provide a miniaturized hydroelectric power generation apparatus which is easy to maintain against debris and foreign matters while suppressing its cost.

Solution to Problem

The present invention, in summary, is a hydroelectric power generation apparatus comprising: a hydraulic turbine; a braking force generation unit configured to apply a braking force to rotation of the hydraulic turbine; and a controller configured to control the braking force generation unit to repeat increasing and decreasing the braking force to vary a rotational speed of the hydraulic turbine or stop the hydraulic turbine from rotating.

Preferably, the braking force generation unit includes an electrical, mechanical or fluid type braking device configured to apply a braking force to a rotary shaft of the hydraulic turbine. The controller is configured to increase and decrease the braking force by repeating actuating the braking device to apply brakes and deactuating the braking device to release brakes.

Preferably, the braking force generation unit includes a power generator configured to generate power through rotation of the hydraulic turbine. The controller is configured to increase/decrease the braking force by varying power extracted from the power generator.

Preferably, the controller, in a case in which increasing and decreasing the braking force is repeated, controls the braking force generation unit so that a period of time in which the braking force increases/decreases in a first period and a period of time in which the braking force increases/decreases in a second period different in length in time from the first period are included.

Preferably, the controller is configured to perform a braking-force control to control the braking force generation unit to repeat increasing and decreasing the braking force when an operating condition is established, and the operating condition includes that an amount of power generated by the hydroelectric power generation unit decreases below a threshold value.

Preferably, the controller is configured to perform a braking-force control to control the braking force generation unit to repeat increasing and decreasing the braking force when an operating condition is established, and the operating condition includes that a rotation speed of the hydraulic turbine decreases below a threshold value.

Preferably, the controller is configured to perform a braking-force control to control the braking force generation unit to repeat increasing and decreasing the braking force when an operating condition is established, and the operating condition includes that a voltage of the hydroelectric power generation apparatus decreases below a threshold value.

Preferably, the controller is configured to perform a braking-force control to control the braking force generation unit to repeat increasing and decreasing the braking force when an operating condition is established, and the operating condition includes that a predetermined period of time has passed since the braking-force control was immediately previously performed.

Preferably, the controller is configured to perform a braking-force control to control the braking force generation unit to repeat increasing and decreasing the braking force when at least two of first to fourth operating conditions are established. The first operating condition includes that an amount of power generated by the hydroelectric power generation unit decreases below a first threshold value. The second operating condition includes that a rotation speed of the hydraulic turbine decreases below a second threshold value. The third operating condition includes that a voltage of the hydroelectric power generation apparatus decreases below a third threshold value. The fourth operating condition includes that a predetermined period of time has passed since the braking-force control was immediately previously performed.

Advantageous Effects of Invention

According to the present invention, a small-size hydroelectric power generation apparatus allows debris and the like adhering to a water turbine thereof to be removed while suppressing an increase in its cost, and can thus be prevented from generating a reduced amount of power.

DESCRIPTION OF EMBODIMENTS

Hereinafter reference will be made to the drawings to describe the present invention in embodiments more specifically. In the following drawings, identical or corresponding components are identically denoted and will not be described redundantly.

Figure 1:
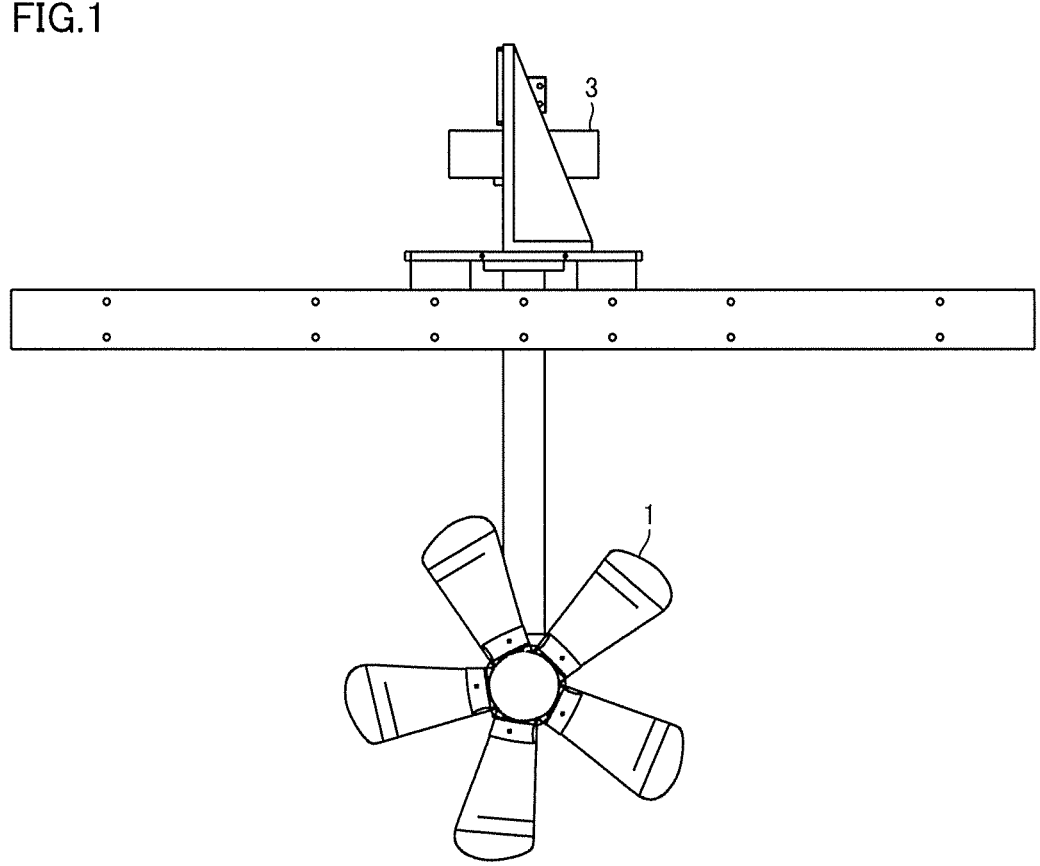
FIG. 1 is a front view showing a schematic shape of a hydroelectric power generation apparatus common to first to third embodiments.
Figure 2:
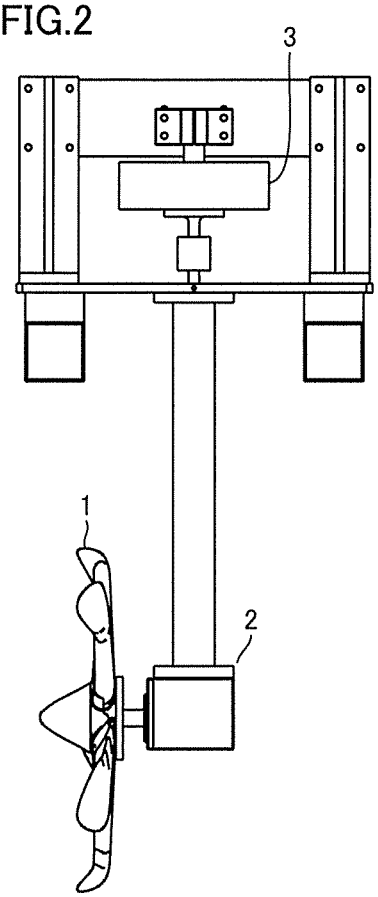
FIG. 2 is a side view showing a schematic shape of the hydroelectric power generation apparatus common to the first to third embodiments.

FIG. 1 is a front view showing a schematic shape of a hydroelectric power generation apparatus common to first to third embodiments. FIG. 2 is a side view showing a schematic shape of the hydroelectric power generation apparatus common to the first to third embodiments.

With reference to FIGS. 1 and 2, the hydroelectric power generation apparatus includes a hydraulic turbine 1, a gear box 2, and a power generator 3. Hydraulic turbine 1 has horizontal-axis-type, propeller-type rotary blades and is rotated by a water current. Power generator 3 is coupled to the hydraulic turbine via gearbox 2. When hydraulic turbine 1 rotates, the rotary shaft of power generator 3 also rotates.

First Embodiment

Figure 3:
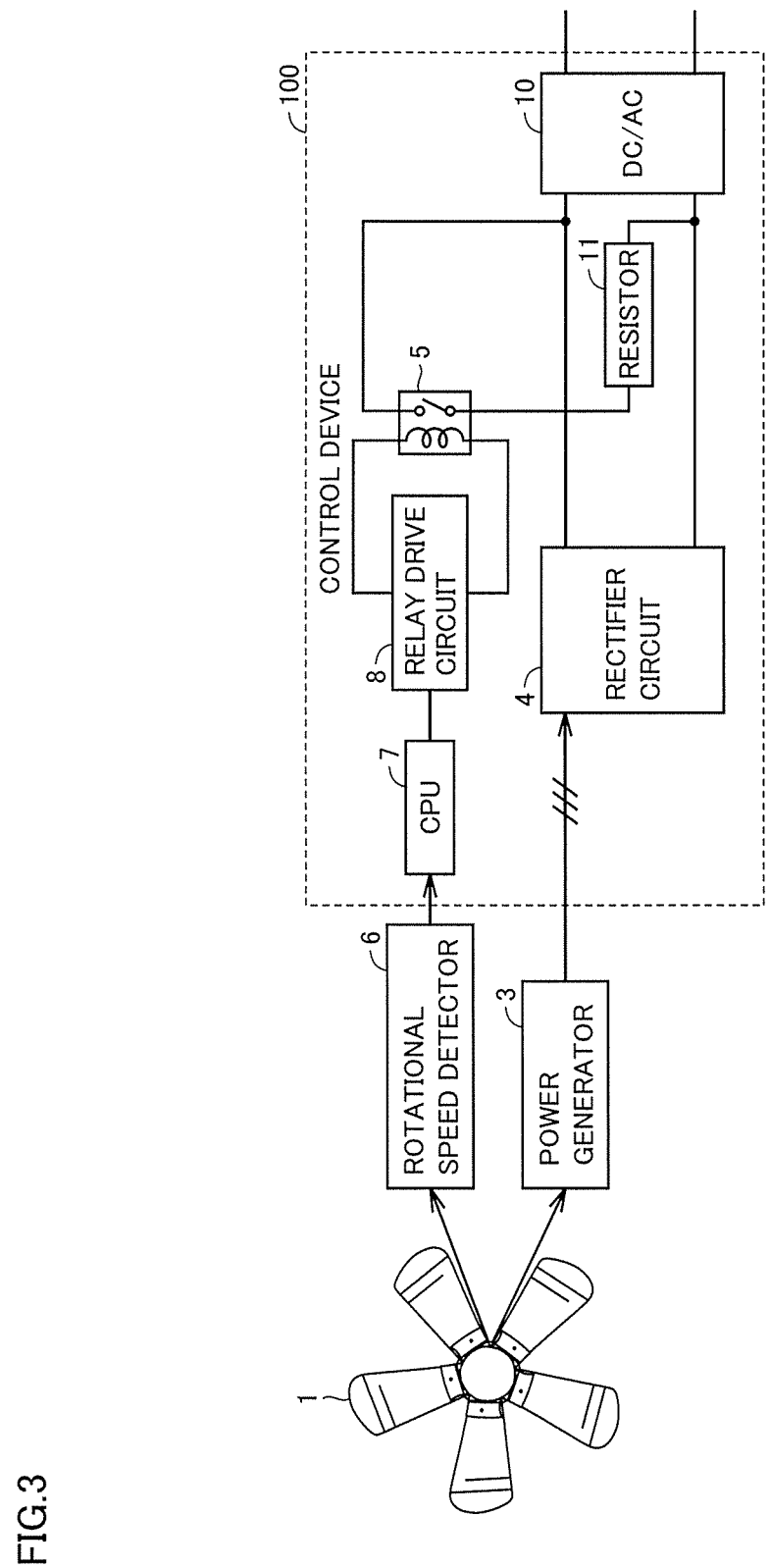
FIG. 3 is a block diagram showing a configuration of a hydroelectric power generation apparatus according to the first embodiment.

FIG. 3 is a block diagram showing a configuration of a hydroelectric power generation apparatus according to the first embodiment. Referring to FIG. 3, the hydroelectric power generation apparatus according to the first embodiment includes hydraulic turbine 1, power generator 3, a rotational speed detector 6, and a control device 100.

Hydraulic turbine 1 rotates depending on the force of running water. Power generator 3 is coupled to hydraulic turbine 1. Power generator 3 generates power as hydraulic turbine 1 rotates. Power generator 3 is a three-phase synchronous power generator, and its output is output in a three-phase alternating current. The three-phase alternating output of power generator 3 is converted into a direct current by a rectifier circuit 4. To this direct-current voltage output, a resistor 11 is connected via a relay 5. When relay 5 is turned off, the direct-current output is exactly output to a DC/AC converter 10 of a subsequent stage. On the other hand, when relay 5 is turned on, the rectified output has positive and negative electrode lines connected via resistor 11, and resistor 11 consumes power. If resistor 11 has a sufficiently small resistance value, resistor 11 consumes large power and will increase a braking force in power generator 3.

While herein a case where power generator 3 is a three-phase synchronous generator will be described as a specific example, the present invention does not limit the power generator to any type, and any type of power generator such as a three-phase induction generator and a direct-current generator can be used in combination with a control device corresponding to the type of the power generator.

Control device 100 for the hydraulic turbine can measure a state of power generator 3, and when debris gets entangled, control device 100 can observe a decrease in the rotational speed of hydraulic turbine 1 and a decrease in an amount of power generated. At the time, control device 100 performs control to repeat applying and releasing brakes to and from power generator 3 (decreasing and increasing its rotational speed). When hydraulic turbine 1 has a reduced rotational speed, the hydraulic turbine blades turn slowly, which in turn reduces water pressure and centrifugal force, and debris and aquatic plants entangled with the hydraulic turbine blades float off hydraulic turbine 1. On the other hand, when hydraulic turbine 1 has an increased rotational speed, the rotation of hydraulic turbine 1 is accelerated and accordingly, water pressure and centrifugal force are increased and a stronger force is applied to debris and aquatic plants, which displaces debris adhering to the hydraulic turbine blades. When applying and releasing brakes to and from power generator 3 is repeated, debris and the like on the hydraulic turbine blades easily float off the hydraulic turbine blades, and a force by a water current to push debris downstream acts to flow debris and the like downstream.

Figure 4:
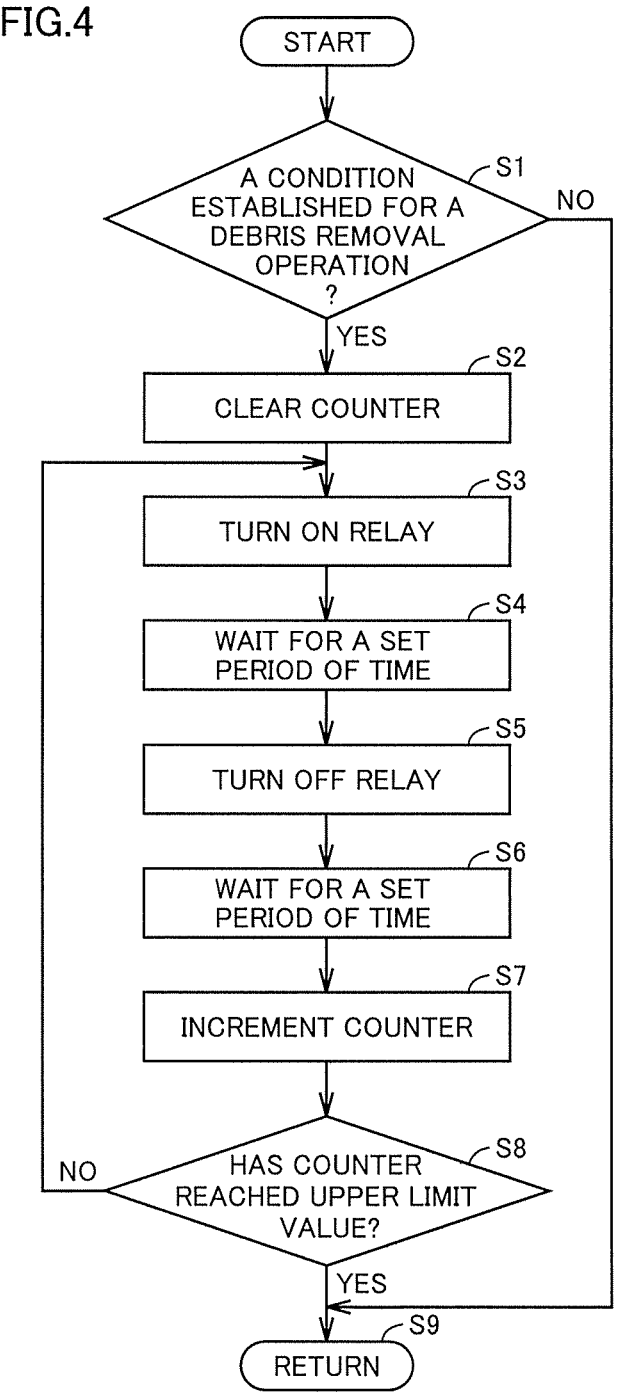
FIG. 4 is a flowchart for illustrating how a CPU controls a relay in the configuration example of FIG. 3.

FIG. 4 is a flowchart for illustrating how a CPU controls a relay in the configuration example of FIG. 3. The flowchart represents a process, which is invoked from a main routine of controlling the power generator at predetermined time intervals and thus executed. With reference to FIGS. 3 and 4, in step S1, a CPU 7 determines whether a condition for a debris removal operation is established.

The condition for the debris removal operation is established when the possibility of debris adhering to hydraulic turbine 1 is increased. For example, when any one of the following conditions (1) to (4) is established, CPU 7 determines that the condition for the debris removal operation is established. When a condition, which is a combination of two or more of the conditions (1) to (4) is established, CPU 7 may determine that the condition for the debris removal operation is satisfied.

Condition (1): the hydroelectric power generation apparatus generates power of an amount decreased below a threshold value. Condition (2): rotational speed detector 6 detects that hydraulic turbine 1 rotates at a speed decreased below a threshold value. Condition (3): the hydroelectric power generation apparatus generates power with voltage decreased below a threshold value. Condition (4): a predetermined period of time has passed since the condition for the debris removal operation was last established (or cancelled).

If it is determined in step S1 that the condition for the debris removal operation is not established (NO in S1), CPU 7 proceeds with step S9. In that case, the control returns to the main routine.

On the other hand, if it is determined in step S1 that the condition for the debris removal operation is established (YES in S1), CPU 7 performs the debris removal operation as indicated in steps S2 to S8.

In the debris removal operation, CPU 7 controls a relay drive circuit 8 to turn on and off relay 5 repeatedly. More specifically, in step S2, CPU 7 clears an incorporated counter. This counter is a counter for counting how many times the repetition is performed. Subsequently, in step S3, CPU 7 controls relay drive circuit 8 to turn on relay 5. Once relay 5 has been turned on, then, in step S4, CPU 7 waits for a set period of time (for example of 1 to 3 seconds). While relay 5 is turned on, the rectified output has positive and negative electrode lines connected via resistor 11, and resistor 11 consumes power. If resistor 11 has a sufficiently small resistance value, resistor 11 consumes large power and will cause a large braking force in power generator 3.

Subsequently, in step S5, CPU 7 controls relay drive circuit 8 to turn off relay 5. Once relay 5 has been turned off, then, in step S6, CPU 7 waits for a set period of time (for example of 1 to 3 seconds). While relay 5 is turned off, the rectified output is output via DC/AC converter 10. In that case, power generator 3 has a load smaller than when resistor 11 consumes power.

Subsequently, CPU 7 increments the counter in step S7, and in step S8 determines whether the counter has counted a value which reaches an upper limit value (the set number of repetitions of increasing/decreasing). If the count value has not reached the upper limit value in step S8, CPU 7 returns the process to step S3 and again turns on the relay.

On the other hand, if the count value reaches the upper limit value in step S8, the control proceeds to step S9, and one debris removal operation thus ends.

In the first embodiment, power consumed by resistor 11 is increased/decreased to vary a load of power generator 3 coupled to hydraulic turbine 1 of the hydroelectric power generation apparatus. This varies the rotational speed of power generator 3 and hence the rotational speed of hydraulic turbine 1 coupled to power generator 3. Foreign matters adhering to hydraulic turbine 1 can be removed by applying force to the foreign matters at the time of acceleration and floating off the foreign matters at the time of deceleration, and flowing the foreign matters downstream by the force of a water current. This has an effect of recovering an amount of power generation reduced due to foreign matters.

Second Embodiment

Figure 5:
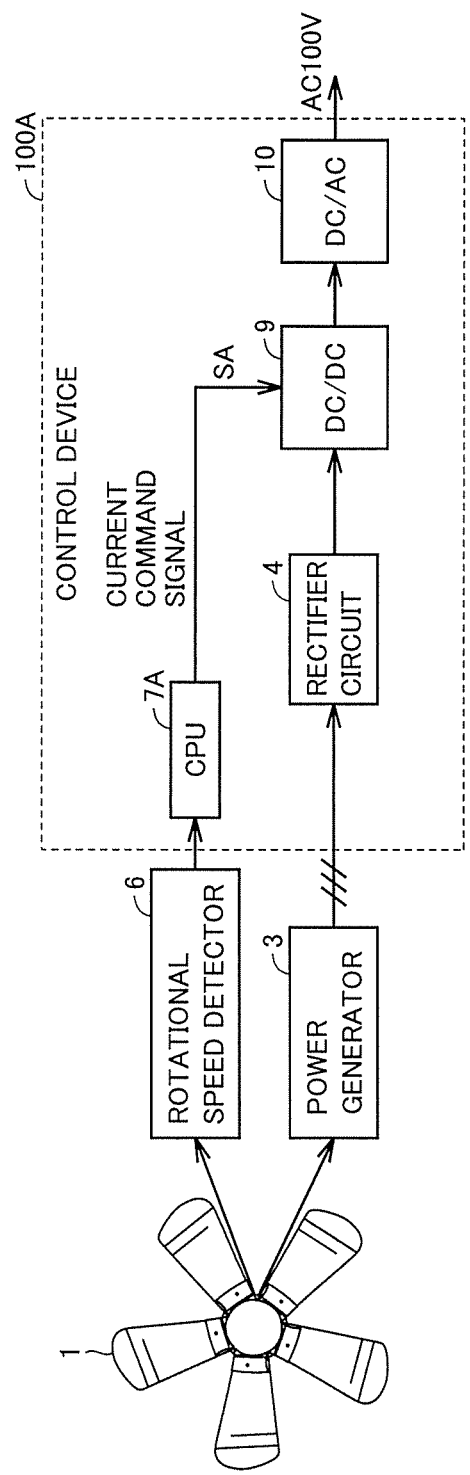
FIG. 5 is a block diagram showing a configuration of a hydroelectric power generation apparatus according to the second embodiment.

FIG. 5 is a block diagram showing a configuration of a hydroelectric power generation apparatus according to a second embodiment. Referring to FIG. 5, the hydroelectric power generation apparatus according to the second embodiment includes hydraulic turbine 1, power generator 3, rotational speed detector 6, and a control device 100A.

Control device 100A includes a CPU 7A, rectifier circuit 4, a DC/DC converter 9, and DC/AC converter 10. Hydraulic turbine 1, power generator 3, rectifier circuit 4, and rotational speed detector 6 are the same as those shown in FIG. 3, and accordingly will not be described repeatedly.

CPU 7A outputs a current command signal SA to DC/DC converter 9. In response to the command of current command signal SA, DC/DC converter 9 extracts power from the output of rectifier circuit 4, and outputs a current according to the command to DC/AC converter 10. Accordingly, DC/DC converter 9 outputs an increased voltage. DC/AC converter 10 outputs power to a subsequent stage. When DC/DC converter 9 outputs an increased voltage, DC/AC converter 10 is configured to suppress the increase of the output voltage of DC/DC converter 9 by outputting more power to the subsequent stage.

Optimum power that can be extracted from hydraulic turbine 1 is determined by velocity of flow of water received by hydraulic turbine 1. The flow velocity is substantially proportional to the rev of power generator 3. The optimum power can be determined by detecting the rotational speed of power generator 3. If power excessively more than the optimum power is extracted from power generator 3, power generator 3 rotates at a reduced speed. At the time, hydraulic turbine 1 coupled to power generator 3 also rotates at a reduced speed. In contrast, if power less than the optimum value, for example of zero, is extracted from power generator 3, power generator 3 rotates at an increased speed and hydraulic turbine 1 coupled to power generator 3 also rotates at an increased speed.

Thus, increasing/decreasing the power extracted from power generator 3 can increase/decrease the rotational speed of hydraulic turbine 1.

Figure 6:
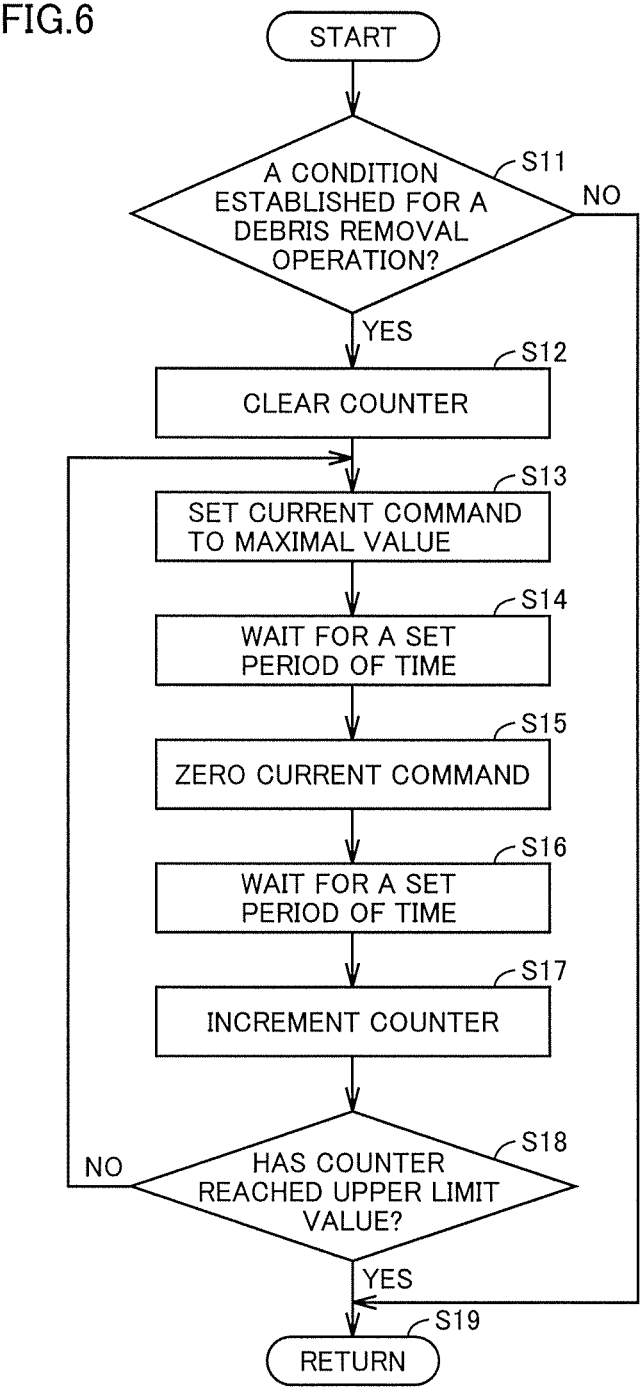
FIG. 6 is a flowchart for illustrating a control applied to remove debris adhering to a hydraulic turbine in FIG. 5.

FIG. 6 is a flowchart for illustrating a control applied to remove debris adhering to the hydraulic turbine in the configuration of FIG. 5. With reference to FIGS. 5 and 6, in step S11, CPU 7A determines whether a condition for a debris removal operation is established.

The condition for the debris removal operation is established when the possibility of debris adhering to hydraulic turbine 1 is increased. As specific conditions (conditions (1) to (4) or a combination thereof), those described in the first embodiment are applicable, and accordingly, they will not be described repeatedly.

If it is determined in step S11 that the condition for the debris removal operation is not established (NO in S11), CPU 7A proceeds with step S19. In that case, the control returns to the main routine.

On the other hand, if it is determined in step S11 that the condition for the debris removal operation is established (YES in S11), CPU 7A performs the debris removal operation as indicated in steps S12 to S18.

In the second embodiment, as the debris removal operation, CPU 7A increases/decreases a current command value issued to DC/DC converter 9. For example, when CPU 7A detects via rotational speed detector 6 that power generator 3 rotates at a reduced speed, CPU 7A outputs current command signal SA to allow an output current to repeat a maximum value and zero to repeat accelerating and decelerating hydraulic turbine 1.

Specifically, in step S12, CPU 7A clears an incorporated counter. This counter is a counter for counting how many times the repetition is performed. Subsequently, in step S13, CPU 7A sets current command signal SA so that DC/DC converter 9 maximizes its output current, and then in step S14 CPU 7A waits for a set period of time (for example of 1 to 3 seconds). While DC/DC converter 9 outputs a maximized output current, large power is consumed, and a large braking force will be generated in power generator 3.

Subsequently, in step S15, CPU 7A sets current command signal SA so that DC/DC converter 9 zeroes its output current, and then in step S16 CPU 7A waits for a set period of time (for example of 1 to 3 seconds). In that case, power generator 3 has a load smaller than when current command signal SA is set to the maximum current, and accordingly, power generator 3 rotates at an increased speed.

Subsequently, CPU 7A increments the counter in step S17, and in step S18 determines whether the counter has counted a value which reaches an upper limit value (the set number of repetitions of increasing/decreasing). If the count value has not reached the upper limit value in step S18, CPU 7A returns the process to step S13 to set current command signal SA to again maximize the output current.

On the other hand, if the count value reaches the upper limit value in step S18, the control proceeds to step S19, and one debris removal operation thus ends.

In the second embodiment, a current command value of DC/DC converter 9 is increased/decreased to vary a load of power generator 3 coupled to hydraulic turbine 1 of the hydroelectric power generation apparatus. This varies the rotational speed of power generator 3 and hence the rotational speed of hydraulic turbine 1 coupled to power generator 3. Foreign matters adhering to hydraulic turbine 1 can be removed by applying force to the foreign matters at the time of acceleration and floating off the foreign matters at the time of deceleration, and flowing the foreign matters downstream by the force of a water current. This has an effect of recovering an amount of power generation reduced due to foreign matters.

Third Embodiment

In the first and second embodiments, hydraulic turbine 1 has a rotational speed increased/decreased by increasing/decreasing a load of power generator 3. Instead of such a control, a braking device 12 discrete from power generator 3 may be provided to the rotary shaft of the hydraulic turbine to generate a braking force.

Figure 7:
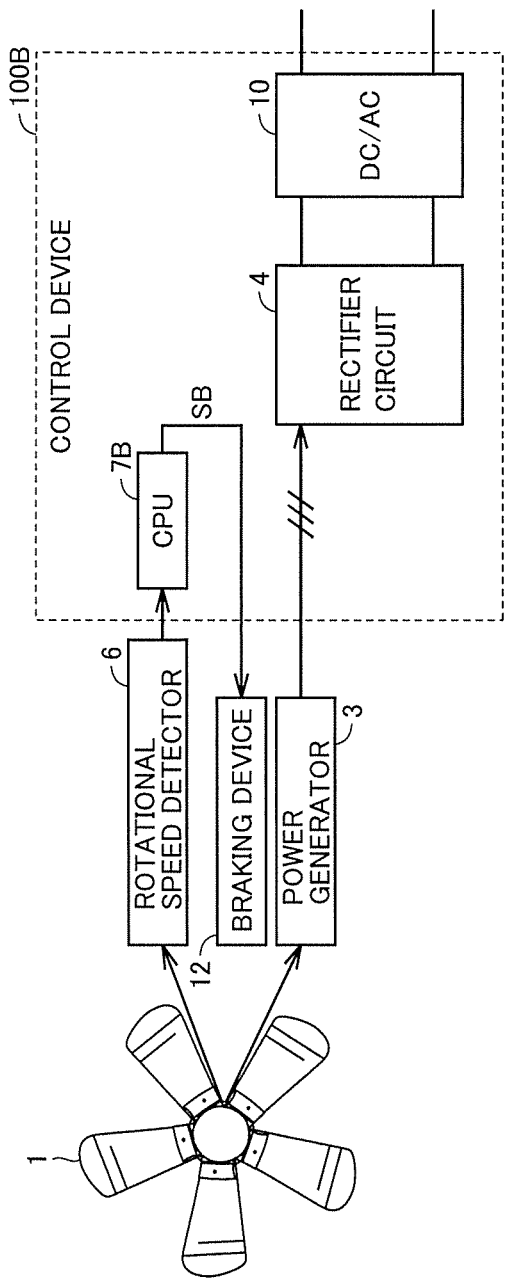
FIG. 7 is a block diagram showing a configuration of a hydroelectric power generation apparatus according to the third embodiment.

FIG. 7 is a block diagram showing a configuration of a hydroelectric power generation apparatus according to a third embodiment. Referring to FIG. 7, the hydroelectric power generation apparatus according to the third embodiment includes hydraulic turbine 1, power generator 3, rotational speed detector 6, a braking device 12, and a control device 100B.

Control device 100B includes a CPU 7B, rectifier circuit 4, and DC/AC converter 10. Hydraulic turbine 1, power generator 3, rectifier circuit 4, and rotational speed detector 6 are the same as those shown in FIG. 3, and accordingly will not be described repeatedly.

As braking device 12, it is possible to use a mechanical brake which converts kinetic energy into heat by friction. For example, an electromagnetic brake or a disc brake can be used as braking device 12.

In the third embodiment, hydraulic turbine 1 can be rotated at an increased/decreased speed or stopped by increasing/decreasing a braking force generated by braking device 12.

Figure 8:
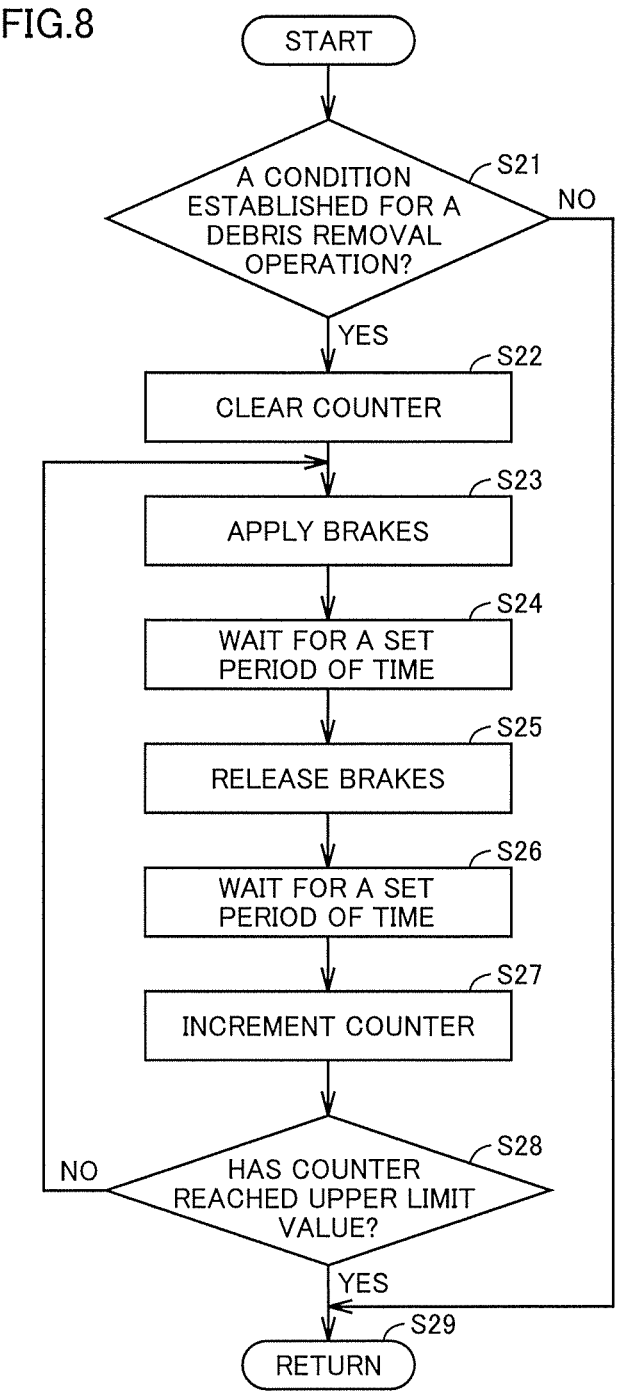
FIG. 8 is a flowchart for illustrating a control applied to remove debris adhering to a hydraulic turbine in FIG. 7.

FIG. 8 is a flowchart for illustrating a control applied to remove debris adhering to the hydraulic turbine in the configuration of FIG. 7. With reference to FIGS. 7 and 8, in step S21, CPU 7B determines whether a condition for a debris removal operation is established.

The condition for the debris removal operation is established when the possibility of debris adhering to hydraulic turbine 1 is increased. As specific conditions (conditions (1) to (4) or a combination thereof), those described in the first embodiment are applicable, and accordingly, they will not be described repeatedly.

If it is determined in step S21 that the condition for the debris removal operation is not established (NO in S21), CPU 7B proceeds with step S29. In that case, the control returns to the main routine.

On the other hand, if it is determined in step S21 that the condition for the debris removal operation is established (YES in S21), CPU 7B performs the debris removal operation as indicated in steps S22 to S28.

In the third embodiment, as the debris removal operation, CPU 7B increases/decreases a braking force generated by braking device 12. For example, when CPU 7B detects via rotational speed detector 6 that power generator 3 rotates at a reduced speed, CPU 7B outputs a command signal to braking device 12 to cause a braking force to repeat a maximum value and zero to repeat accelerating and decelerating hydraulic turbine 1.

Specifically, in step S22, CPU 7B clears an incorporated counter. This counter is a counter for counting how many times the repetition is performed. Subsequently, in step S23, CPU 7B sets a command signal SB to cause braking device 12 to generate a braking force (or apply brakes). Subsequently, in step S24, CPU 7B waits for a set period of time (for example of 1 to 10 seconds) with the brakes applied.

Subsequently, in step S25, CPU 7B sets command signal SB to prevent braking device 12 from generating a braking force (or release brakes). Subsequently, in step S26, CPU 7B waits for a set period of time (for example of 1 to 10 seconds) with the brakes released.

Subsequently, CPU 7B increments the counter in step S27, and in step S28 determines whether the counter has counted a value which reaches an upper limit value (the set number of repetitions of increasing/decreasing). If the count value has not reached the upper limit value in step S28, CPU 7B returns the process to step S23 and again applies brakes.

On the other hand, if the count value reaches the upper limit value in step S28, the control proceeds to step S29, and one debris removal operation thus ends.

In the third embodiment, braking device 12 is installed for power generator 3 coupled to hydraulic turbine 1 of the hydroelectric power generation apparatus, and braking device 12 is repeatedly turned on and off. This varies the rotational speed of power generator 3 and hence the rotational speed of hydraulic turbine 1 coupled to power generator 3. Foreign matters adhering to hydraulic turbine 1 can be removed by applying force to the foreign matters at the time of acceleration and floating off the foreign matters at the time of deceleration, and flowing the foreign matters downstream by the force of a water current. This has an effect of recovering an amount of power generation reduced due to foreign matters.

Braking device 12 of the third embodiment may be added to the configuration of the first embodiment or the second embodiment, and the control applied to vary the power extracted from power generator 3 and the control applied to vary the braking force of braking device 12 may be combined together.

While in the first to third embodiments the set period of time in steps S4, S14, S24 and the set period of time in step S6, S16, S26 have fixed values while they are repeated until a counter reaches an upper limit value, the set periods of time may alternatively be varied.

Debris and aquatic plants have various sizes and shapes, and some debris tends to easily come off when the hydraulic turbine is rotated at a quickly varying speed, whereas other debris tends to easily come off when the hydraulic turbine is rotated at a speed varying in a large period. Varying the rhythm of repetition of applying and releasing brakes, and the magnitude of brakes applied and released, rather than fixing them to a determined value, allows foreign matters of various sizes and shapes to be handled.

More specifically, a pattern of varying a set period of time is predetermined and stored in memory, and in the flowcharts of FIGS. 4, 6, and 8 whenever a loop is completed the set period of time is read from memory and set to allow a rotational speed of hydraulic turbine 1 to be changed in any desired variation pattern. A variation pattern allowing debris to easily come off may be determined through an experiment and adopted.

Fourth Embodiment

The first to third embodiments have been described by referring as an example to a power generation apparatus that generates power by receiving running water by a hydraulic turbine having a horizontal-axis-type, propeller-type rotary blades shown in FIGS. 1 and 2. In a fourth embodiment will be described that the present invention is also applicable to a power generation apparatus which generates power by receiving running water by a hydraulic turbine having vertical-axis-type rotary blades.

Figure 9:
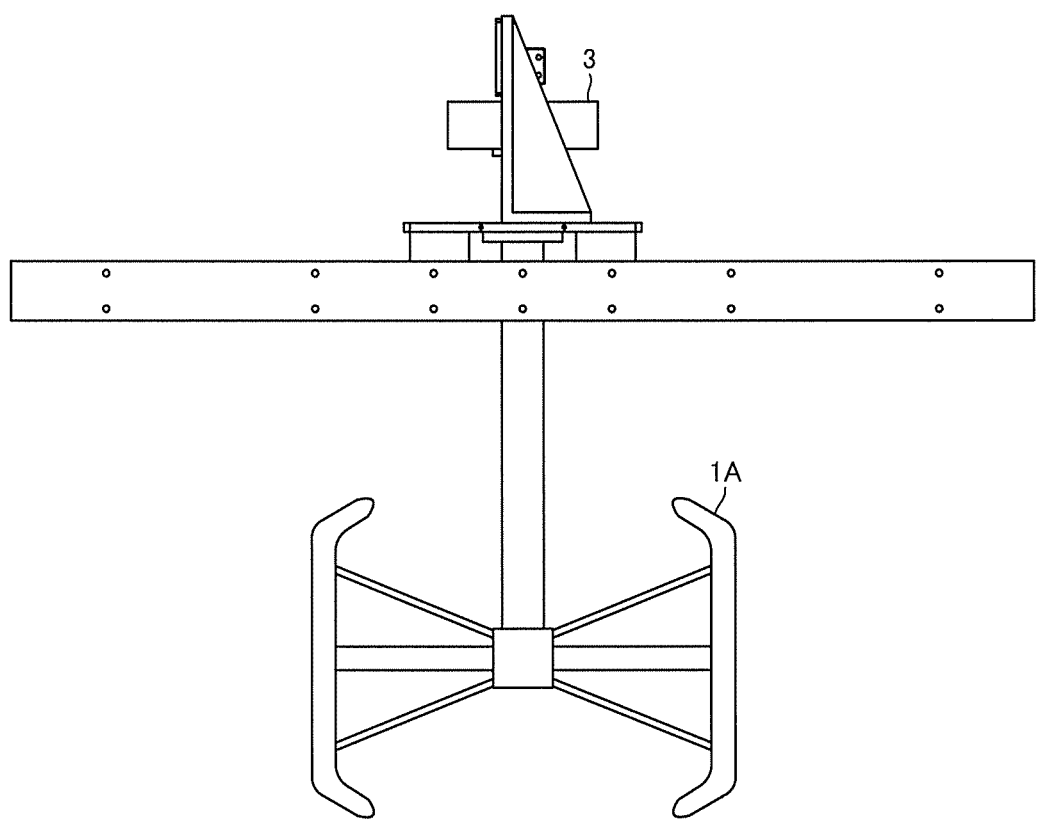
FIG. 9 is a front view showing a schematic shape of a hydroelectric power generation apparatus according to a fourth embodiment.

FIG. 9 is a front view showing a schematic shape of a hydroelectric power generation apparatus according to the fourth embodiment. With reference to FIG. 4, the hydroelectric power generation apparatus according to the fourth embodiment includes a hydraulic turbine 1A and power generator 3. Hydraulic turbine 1A has vertical-axis-type rotary blades and is rotated by a water current. Power generator 3 is connected to the rotary shaft of hydraulic turbine 1A. When hydraulic turbine 1A rotates, the rotary shaft of power generator 3 also rotates.

The control devices and flowcharts shown in FIGS. 3 to 8 are also applicable to the FIG. 9 hydraulic turbine 1A similarly in combination. The control devices and flowcharts shown in FIGS. 3 to 8 have been described in the first to third embodiments, and accordingly, will not be described repeatedly.

While vertical-axis-type hydraulic turbine 1A is of a linear blade type and shown by way of example in a configuration with a blade having upper and lower ends bent toward the rotary shaft, as shown in FIG. 9, it is not particularly limited thereto. For example, it may be a different type such as Darrieus type, giromill type, Savonius type, cross flow type, paddle type, S type rotor type and the like.

The hydroelectric power generation apparatus according to the fourth embodiment also allows power generator 3 to be rotated at a varying speed and hydraulic turbine 1A coupled to power generator 3 to be rotated at a varying speed. Foreign matters adhering to hydraulic turbine 1A can be removed by applying force to the foreign matters at the time of acceleration and floating off the foreign matters at the time of deceleration, and flowing the foreign matters downstream by the force of a water current. This has an effect of recovering an amount of power generation reduced due to foreign matters.

Although some parts overlap the above description, the first to fourth embodiments will finally be summarized as below: The hydroelectric power generation apparatus of the present embodiment comprises a hydraulic turbine 1, a braking force generation unit configured to apply a braking force to rotation of hydraulic turbine 1, and control devices 100, 100A, 100B configured to control the braking force generation unit to repeat increasing and decreasing the braking force to vary a rotational speed of hydraulic turbine 1.

Varying the rotational speed of hydraulic turbine 1 or stopping hydraulic turbine 1 from rotating helps to flow away debris and the like adhering to the hydraulic turbine blades.

Preferably, as shown in FIG. 7, the braking force generation unit includes an electrical type or mechanical type braking device 12 configured to apply a braking force to a rotary shaft of hydraulic turbine 1. Control device 100B increases and decreases the braking force by repeating actuating braking device 12 to apply brakes and deactuating braking device 12 to release brakes.

Preferably, as shown in FIGS. 3, 5, and 7, the braking force generation unit includes a power generator 3 configured to generate power through rotation of hydraulic turbine 1. Control devices 100, 100A, 100B increase/decrease the braking force by varying power extracted from power generator 3.

Preferably, control devices 100, 100A, and 100B, in a case in which increasing and decreasing the braking force is repeated, controls the braking force generation unit so that a period of time in which the braking force increases/decreases in a first period (e.g., of 1 to 3 seconds) and a period of time in which the braking force increases/decreases in a second period (e.g., of 5 to 10 seconds) different in length in time from the first period are included. Note that the first and second periods are not limited to the above example, and may be a different period.

Thus determining a period allows a variety of types of debris and foreign matters having different sizes and shapes to be handled.

Preferably, control devices 100, 100A, and 100B are configured to perform a braking-force control to control the braking force generation unit to repeat increasing and decreasing the braking force when a condition for a debris removal operation of FIGS. 1, 4, and 8 is established (YES in S1, S11, S21). The condition for the debris removal operation includes that the hydroelectric power generation apparatus generates power of an amount decreased below a threshold value.

Preferably, control devices 100, 100A, and 100B are configured to perform a braking-force control to control the braking force generation unit to repeat increasing and decreasing the braking force when a condition for a debris removal operation of FIGS. 1, 4, and 8 is established (YES in S1, S11, S21). The condition for the debris removal operation includes that hydraulic turbine 1 rotates at a speed decreased below a threshold value.

Preferably, control devices 100, 100A, and 100B are configured to perform a braking-force control to control the braking force generation unit to repeat increasing and decreasing the braking force when a condition for a debris removal operation of FIGS. 1, 4, and 8 is established (YES in S1, S11, S21). The condition for the debris removal operation includes that the hydroelectric power generation apparatus generates power with voltage decreased below a threshold value.

Preferably, control devices 100, 100A, and 100B are configured to perform a braking-force control to control the braking force generation unit to repeat increasing and decreasing the braking force when a condition for a debris removal operation of FIGS. 1, 4, and 8 is established (YES in S1, S11, S21). The condition for the debris removal operation includes that a predetermined period of time has passed since the braking-force control was immediately previously performed. In that case, the debris removal operation is performed at predetermined time intervals irrespective of variation of the amount of power generated.

Preferably, control devices 100, 100A, and 100B are configured to perform a braking-force control to control the braking force generation unit to repeat increasing and decreasing the braking force when at least two of the following first to fourth operating conditions are established. The first operating condition includes that the hydroelectric power generation apparatus generates power of an amount decreased below a first threshold value. The second operating condition includes that hydraulic turbine 1 rotates at a speed decreased below a second threshold value. The third operating condition includes that the hydroelectric power generation apparatus generates power with voltage decreased below a third threshold value. The fourth operating condition includes that a predetermined period of time has passed since the braking-force control was immediately previously performed.

Thus setting a condition for starting an operation can prevent a significant reduction in an amount of power generated that is attributed to adhesion of debris or the like to hydraulic turbine blades.

Preferably, it is desirable that the rotational speed of hydraulic turbine 1 repeats increasing and decreasing the braking force from a predetermined rotational speed to obtain a sufficient speed variation range for hydraulic turbine 1. Hydraulic turbine 1 receives water at a flow velocity significantly varying in a long term, and it may significantly decrease in a season with a small rainfall amount. Accordingly, the rotational speed of hydraulic turbine 1 also decreases, and, with hydraulic turbine 1 having a decreased rotational speed, even if an operation of increasing and decreasing the braking force is repeated, hydraulic turbine 1 has a rotational speed with a small variation range, and a predetermined debris removal effect may not be obtained in some cases. When hydraulic turbine 1 has a decreased rotational speed, it is desirable that power extracted from power generator 3 be decreased (a power generating load is decreased) to increase the rotational speed of hydraulic turbine 1, and thereafter the debris removal operation of the first to fourth embodiments be performed.

Preferably, as shown in FIGS. 1 to 3, hydraulic turbine 1 has a horizontal-axis-type, propeller-type rotary blade.

Preferably, as shown in FIG. 9, hydraulic turbine 1A has a vertical-axis-type rotary blade.

Preferably, a reduction in an amount of power generated that is attributed to debris can be prevented by using any one of the above-described hydroelectric power generation apparatuses in a power generation system performing ocean current power generation, tidal power generation or wave power generation converting kinetic energy possessed by running water into electric power.

In the above embodiment, foreign matters can be removed by generating an increasing/decreasing braking force in a power generator or a braking device and varying a hydraulic turbine's rotational speed. In this case, there are two advantages, as follows:

The first advantage is that a braking function allows the hydraulic turbine to rotate at a varying speed and a controller for hydroelectric power generation without an inverter function (a motor driving function) can also be implemented.

The second advantage is that as the presence of the braking function allows a debris removal operation to be implemented, and while the debris removal operation is performed, a reduced amount of power is generated, however, the power is never consumed and a power generator's originally intended function, i.e., a power generating function, is not impaired, and a power source for an electric motor during the debris removal operation is also unnecessary.

It should be understood that the embodiment disclosed herein have been described for the purpose of illustration only and in a non-restrictive manner in any respect. The scope of the present invention is defined by the terms of the claims, rather than the embodiment described above, and is intended to include any modifications within the meaning and scope equivalent to the terms of the claims.

REFERENCE SIGNS LIST 1, 1A: hydraulic turbine; 2: gear box; 3: power generator; 4: rectifier circuit; 5: relay; 6: rotational speed detector; 8: relay derive circuit; 9: DC/DC converter; 10: DC/AC converter; 11: resistor; 12: braking device; 100, 100A, 100B: control device.

The invention claimed is:

1. A hydroelectric power generation apparatus comprising:
   a hydraulic turbine;
   a brake configured to apply a braking force to rotation of the hydraulic turbine; and
   a controller configured to control the brake to repeat increasing and decreasing the braking force to vary a rotational speed of the hydraulic turbine or stop the hydraulic turbine from rotating,
   wherein the controller is configured to perform a braking-force control to control the brake to repeat increasing and decreasing the braking force when an operating condition is established, and
   wherein the operating condition includes that a voltage of the hydroelectric power generation apparatus decreases below a threshold value.

2. The hydroelectric power generation apparatus according to claim 1, wherein:
   the brake includes an electrical, mechanical or fluid braking device configured to apply a braking force to a rotary shaft of the hydraulic turbine, and
   the controller is configured to increase and decrease the braking force by repeating actuating the braking device to apply brakes and deactuating the braking device to release brakes.

3. The hydroelectric power generation apparatus according to claim 1, wherein:
   the brake includes a power generator configured to generate power through rotation of the hydraulic turbine, and
   the controller is configured to increase/decrease the braking force by varying power extracted from the power generator.

4. The hydroelectric power generation apparatus according to claim 3, wherein power extracted from the power generator is decreased to increase the rotational speed of the hydraulic turbine, and thereafter the brake is controlled to repeat increasing and decreasing the braking force.

5. The hydroelectric power generation apparatus according to claim 1, wherein the controller, in a case in which increasing and decreasing the braking force is repeated, controls the brake so that a period of time in which the braking force increases/decreases in a first period and a period of time in which the braking force increases/decreases in a second period different in length in time from the first period are included.

6. The hydroelectric power generation apparatus according to claim 1, wherein:
   the controller is configured to perform a braking-force control to control the brake to repeat increasing and decreasing the braking force when an operating condition is established, and
   the operating condition includes that an amount of power generated by the hydroelectric power generation unit decreases below a threshold value.

7. The hydroelectric power generation apparatus according to claim 1, wherein:
   the controller is configured to perform a braking-force control to control the brake to repeat increasing and decreasing the braking force when an operating condition is established, and
   the operating condition includes that a rotation speed of the hydraulic turbine decreases below a threshold value.

8. The hydroelectric power generation apparatus according to claim 1, wherein:
   the controller is configured to perform a braking-force control to control the brake to repeat increasing and decreasing the braking force when an operating condition is established, and
   the operating condition includes that a predetermined period of time has passed since the braking-force control was immediately previously performed.

9. The hydroelectric power generation apparatus according to claim 1, wherein:
   the controller is configured to perform a braking-force control to control the brake to repeat increasing and decreasing the braking force when at least two of first to fourth operating conditions are established,
   the first operating condition includes that an amount of power generated by the hydroelectric power generation unit decreases below a first threshold value,
   the second operating condition includes that a rotation speed of the hydraulic turbine decreases below a second threshold value,
   the third operating condition includes that a voltage of the hydroelectric power generation apparatus decreases below a third threshold value, and
   the fourth operating condition includes that a predetermined period of time has passed since the braking-force control was immediately previously performed.

10. The hydroelectric power generation apparatus according to claim 1, wherein the hydraulic turbine has horizontal-axis propeller rotary blades.

11. The hydroelectric power generation apparatus according to claim 1, wherein the hydraulic turbine has vertical-axis rotary blades.

12. A power generation system for performing ocean current power generation or tidal power generation, the power generation system comprising the hydroelectric power generation apparatus of claim 1, wherein the hydroelectric power generation apparatus converts kinetic energy of running water into electric power.

13. A hydroelectric power generation apparatus comprising:
   a hydraulic turbine;
   a brake configured to apply a braking force to rotation of the hydraulic turbine; and
   a controller configured to control the brake to repeat increasing and decreasing the braking force to vary a rotational speed of the hydraulic turbine or stop the hydraulic turbine from rotating,
   wherein the controller is configured to perform a braking-force control to control the brake to repeat increasing and decreasing the braking force when an operating condition is established, and
   the operating condition includes that a predetermined period of time has passed since the braking-force control was immediately previously performed.

14. The hydroelectric power generation apparatus according to claim 13, wherein the brake includes an electrical, mechanical or fluid braking device configured to apply a braking force to a rotary shaft of the hydraulic turbine, and the controller is configured to increase and decrease the braking force by repeating actuating the braking device to apply brakes and deactuating the braking device to release brakes.

15. The hydroelectric power generation apparatus according to claim 13, wherein the brake includes a power generator configured to generate power through rotation of the hydraulic turbine, and the controller is configured to increase/decrease the braking force by varying power extracted from the power generator.

16. The hydroelectric power generation apparatus according to claim 13, wherein the controller, in a case in which increasing and decreasing the braking force is repeated, controls the brake so that a period of time in which the braking force increases/decreases in a first period and a period of time in which the braking force increases/decreases in a second period different in length in time from the first period are included.

17. The hydroelectric power generation apparatus according to claim 13, wherein the controller is configured to perform a braking-force control to control the brake to repeat increasing and decreasing the braking force when an operating condition is established, and the operating condition includes that an amount of power generated by the hydroelectric power generation unit decreases below a threshold value.

18. The hydroelectric power generation apparatus according to claim 13, wherein the controller is configured to perform a braking-force control to control the brake to repeat increasing and decreasing the braking force when an operating condition is established, and the operating condition includes that a rotation speed of the hydraulic turbine decreases below a threshold value.

19. The hydroelectric power generation apparatus according to claim 13, wherein the controller is configured to perform a braking-force control to control the brake to repeat increasing and decreasing the braking force when an operating condition is established, and the operating condition includes that a voltage of the hydroelectric power generation apparatus decreases below a threshold value.

20. The hydroelectric power generation apparatus according to claim 13, wherein the controller is configured to perform a braking-force control to control the brake to repeat increasing and decreasing the braking force when at least two of first to fourth operating conditions are established, the first operating condition includes that an amount of power generated by the hydroelectric power generation unit decreases below a first threshold value, the second operating condition includes that a rotation speed of the hydraulic turbine decreases below a second threshold value, the third operating condition includes that a voltage of the hydroelectric power generation apparatus decreases below a third threshold value, and the fourth operating condition includes that a predetermined period of time has passed since the braking-force control was immediately previously performed.

* * * * *